(12) United States Patent
Chun et al.

(10) Patent No.: US 8,139,661 B2
(45) Date of Patent: Mar. 20, 2012

(54) SIGNAL TRANSMITTING AND RECEIVING APPARATUSES

(75) Inventors: Sun-Sim Chun, Daejeon (KR); Hyeong-Jun Park, Daejeon (KR); Ok-Sun Park, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 967 days.

(21) Appl. No.: 11/635,576

(22) Filed: Dec. 8, 2006

(65) Prior Publication Data

US 2007/0133702 A1    Jun. 14, 2007

(30) Foreign Application Priority Data

Dec. 8, 2005  (KR) .................. 10-2005-0120144
Jul. 11, 2006  (KR) .................. 10-2006-0064678

(51) Int. Cl.
*H04K 1/10* (2006.01)

(52) U.S. Cl. ........ 375/260; 375/295; 375/316; 375/344; 375/354; 375/355; 375/362

(58) Field of Classification Search .................. 375/260, 375/295
See application file for complete search history.

(56) References Cited

U.S. PATENT DOCUMENTS

| | | | | |
|---|---|---|---|---|
| 5,818,813 A | * | 10/1998 | Saito et al. ................ | 370/208 |
| 6,956,895 B2 | | 10/2005 | Vihriälä | |
| 6,993,084 B1 | | 1/2006 | Eberlein et al. | |
| 7,616,719 B1 | * | 11/2009 | Narasimhan ............ | 375/346 |
| 2001/0018719 A1 | * | 8/2001 | Francis ................... | 710/22 |
| 2004/0047296 A1 | * | 3/2004 | Tzannes et al. .......... | 370/252 |
| 2004/0082356 A1 | * | 4/2004 | Walton et al. ............ | 455/522 |
| 2005/0099936 A1 | * | 5/2005 | Fujii et al. ............... | 370/203 |
| 2005/0163094 A1 | * | 7/2005 | Okada et al. ............. | 370/343 |
| 2006/0050626 A1 | * | 3/2006 | Yucek et al. ............. | 370/208 |
| 2009/0003465 A1 | * | 1/2009 | Yun et al. ................ | 375/260 |
| 2009/0276069 A1 | * | 11/2009 | Rogers ..................... | 700/94 |

FOREIGN PATENT DOCUMENTS

| | | |
|---|---|---|
| CN | 1292964 | 4/2001 |
| CN | 1527513 | 9/2004 |
| KR | 1020050019265 | 3/2005 |
| KR | 1020050040988 | 5/2005 |
| KR | 1020050066634 | 6/2005 |
| KR | 1020050102332 | 10/2005 |

(Continued)

OTHER PUBLICATIONS

Eberlein, Ernst, Frame structure and frame synchronization for multicarrier systems, Oct. 21, 1999, WO 99/53665.*

(Continued)

*Primary Examiner* — Siu Lee
(74) *Attorney, Agent, or Firm* — Lowe Hauptman Ham & Berner, LLP

(57) ABSTRACT

The present invention relates to signal transmitting/receiving apparatuses. The signal transmitting apparatus includes an inverse discrete Fourier transform module, a cyclic prefix adding module, a preamble adding module, and a digital-analog converting module. The inverse discrete Fourier transform module receives modulated data, performs inverse discrete Fourier transform, and generates a first symbol. The cyclic prefix adding module adds a predetermined cyclic prefix to the first symbol, and generates a second symbol. The preamble adding module adds a predetermined preamble to the second symbol, and generates a third symbol. The digital-analog converting module converts the third symbol including the cyclic prefix and the preamble into an analog symbol.

6 Claims, 6 Drawing Sheets

FOREIGN PATENT DOCUMENTS

WO    99/53665    10/1999

OTHER PUBLICATIONS

Office Action dated Jul. 31, 2009, for Chinese application No. 2006101729071.

Rickard Nilsson, et al.; "An Analysis of Two-Dimensional Pilot-Symbol Assisted Modulation for OFDM"; IEEE International Conference on Personal Wireless Communications (ICPWC '97), pp. 71~74, Bombay, India, Dec. 1997.

Histoshi Takanashi, et al; "OFDM Physical Layer Specification for the 5GHz Band" ; IEEE P802.11 Wireless LANs, pp. 1-27, (Jul. 1998).

Chinese Office Action for Chinese application No. 200610172907.1, citing the attached references.

* cited by examiner

SIGNAL TRANSMITTING AND RECEIVING APPARATUSES

CROSS-REFERENCE TO RELATED APPLICATION

This application claims priority to and the benefit of Korean Patent Application No. 10-2005-0120144 filed in the Korean Intellectual Property Office on Dec. 8, 2005, and No. 10-2006-0064678 filed in the Korean Intellectual Property Office on Jul. 11, 2006, the entire contents of which are incorporated herein by reference.

BACKGROUND OF THE INVENTION (a) Field of the Invention

The present invention relates to signal transmitting/receiving apparatuses. More particularly, the present invention relates to signal transmitting/receiving apparatuses in an orthogonal frequency-division multiplexing (OFDM) system for minimizing a sampling clock error caused by a slight period difference.

(b) Description of the Related Art

In a wireless channel environment, subcarrier power varies and subcarrier phases are distorted. A system for performing orthogonal frequency-division multiplexing (OFDM) to compensate such a distorted signal compensates a channel after performing a discrete Fourier transform.

As a prior art, a paper entitled "An Analysis of Two Dimensional Pilot Symbol Assisted Modulation for OFDM" has been disclosed in International Conference on Personal Wireless Communications (ICPWC) 1997, pp. 71-74.

This prior art relates to a two-dimensional channel compensation method used in the OFDM system. That is, a pilot that satisfies pilot providing interval conditions of a time domain given as Equation 1 and a frequency domain given as Equation 2 is provided to a transmission symbol of a transmitting apparatus, a channel is estimated by using an interpolation method in a receiving apparatus, and data are demodulated through the estimated channel.

$$S_t < \frac{1}{B_d} \quad \text{[Equation 1]}$$

Here, $S_t$ denotes a time domain pilot providing interval, and $B_d$ denotes Doppler spread.

$$S_f < \frac{1}{t_{max}} \quad \text{[Equation 2]}$$

Here, $S_f$ denotes a frequency domain pilot providing interval, and $t_{max}$ denotes maximum delay spread.

In the above prior art, there is a problem in that the pilot providing interval may not be optimized when there is a time difference between the transmitting apparatus and the receiving apparatus. In addition, an OFDM symbol including a first pilot signal is delayed for a predetermined time to obtain a channel estimate value by using the OFDM symbol including the first pilot signal and the OFDM symbol including a second pilot signal in the receiving apparatus.

Accordingly, a system for reporting a transmitted packet decoding error after performing a decoding operation may not appropriately operate due to the OFDM symbol delay.

In addition, as another prior art relating to a radio channel compensation method, a paper entitled "OFDM Physical Layer Specification for the 5 GHz Band" has been disclosed in IEEE P802.11 Wireless LANs, pp1-27, (July 1998).

In this prior art, to prevent a delay between symbols in a channel estimating process, the transmitting apparatus provides a preamble signal to subcarriers of two subsequent OFDM symbols to transmit the OFDM symbols, and provides a pilot signal to predetermined subcarrier sections of other OFDM symbols. The receiving apparatus uses the two OFDM symbols including the preamble signal to estimate a channel, and the other OFDM symbols are modulated based on the estimated channel.

Here, performance may be optimized when a channel variance caused by the two subsequent OFDM symbols is maintained until a last symbol is transmitted. However, in an actual system, since the channel variance may not be maintained, it is difficult to optimize the performance.

FIG. 1 shows a block diagram representing a data packet used in a conventional OFDM system.

As shown in FIG. 1, the data packet includes a cyclic prefix 11 and a data area 12, and it is susceptible to a delay profile in a wireless channel environment.

Refereeing to FIG. 1, the OFDM system estimates a timing error and a frequency error in a time domain and offset the errors when obtaining synchronization by using the cyclic prefix 11.

However, the estimated error causes a remaining frequency offset. In addition, when a time error occurs between the transmitting apparatus and the receiving apparatus, the remaining frequency offset causes an accumulated phase difference between the first subcarrier and the last subcarrier. The accumulated phase difference becomes greater in second and third OFDM symbols than in a first OFDM symbol when it is not compensated in each OFDM symbol, and therefore, it may not be demodulated. Particularly, the accumulated phase difference may problematically cause a signal to noise ratio (SNR) loss.

The accumulated phase difference caused in the conventional OFDM system will be described in Equation 3 and Equation 4.

A sampling clock signal error caused by a sampling period difference between the transmitting apparatus and the receiving apparatus is given as Equation 3.

$$t_\Delta = \frac{T' - T}{T} \quad \text{[Equation 3]}$$

Here, T and T' denote sampling periods of the transmitting apparatus and the receiving apparatus. An effect on a subcarrier $R_{n,k}$ of an $n^{th}$ symbol received after performing a discrete Fourier transform is given as Equation 4.

$$R_{n,k} = e^{j2\pi k t_\Delta n \frac{T_s}{T_u}} x_{n,k} \operatorname{sinc}(\pi k t_\Delta) H_{n,k} + w_{n,k} \quad \text{[Equation 4]}$$

Here, $T_s$ and $T_u$ respectively denote an entire OFDM symbol period and an actually applied data period, and $w_{n,k}$ denotes a additive white Gaussian noise (AWGN).

$$e^{j2\pi k t_\Delta n \frac{T_s}{T_u}}$$

denotes a phase grating rate according to each subcarrier. When a period difference of tΔ occurs, a phase grating rate difference between the first subcarrier and the last subcarrier may become greater. Particularly, as the number of subcarriers increases, the phase grating rate becomes greater.

In cyclic prefix compensation, an error at a time domain is more precisely estimated than in a packet obtaining synchronization to offset the accumulated phase difference. In this case, compared to a system including a lesser number of subcarriers, more phases remain in a system having a greater number of subcarriers and a plurality of OFDM symbol periods after performing the cyclic prefix compensation. That is, the sampling clock signal error caused by the sampling period difference between the transmitting apparatus and the receiving apparatus may not offset the frequency offset of the accumulated subcarrier by estimating the cyclic prefix by using the cyclic prefix.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide orthogonal frequency-division multiplexing (OFDM) signal transmitting and receiving apparatuses for minimizing a sampling clock error caused by a slight period difference.

An exemplary signal transmitting apparatus according to an embodiment of the present invention includes an inverse discrete Fourier transform module, a cyclic prefix adding module, a preamble adding module, and a digital-analog converting module. The inverse discrete Fourier transform module receives modulated data, performs an inverse discrete Fourier transform, and generates a first symbol. The cyclic prefix adding module adds a predetermined cyclic prefix to the first symbol, and generates a second symbol. The preamble adding module adds a predetermined preamble to the second symbol, and generates a third symbol. The digital-analog converting module converts the third symbol including the cyclic prefix and the preamble into an analog symbol. Here, a short preamble is used as the preamble, and it is added to a former part of the second symbol since there is delay in a wireless environment.

An exemplary signal receiving apparatus for receiving an orthogonal frequency-division multiplexing (OFDM) symbol including a cyclic prefix and a preamble from a transmitting apparatus, according to an embodiment of the present invention, includes an analog-digital converting module, a time domain channel estimating module, and a discrete Fourier transform module. The analog-digital converting module receives the OFDM symbol and converts the OFDM symbol into a digital symbol. The time domain channel estimating module extracts the cyclic prefix and the preamble from the digital symbol, calculates a phase value and a synchronization value by using the extracted preamble and cyclic prefix, and compensates a channel for the digital symbol by using the calculated synchronization value and the phase value. The discrete Fourier transform module inverse Fourier transforms the symbol received from the time domain channel estimating module.

Here, the time domain channel estimating module performs first compensation for the digital symbol by using a symbol synchronization value and a first phase value that are obtained by using the preamble, and performs a second compensation by using a second phase value obtained by using the cyclic prefix.

DETAILED DESCRIPTION OF THE EMBODIMENTS

Figure 1:
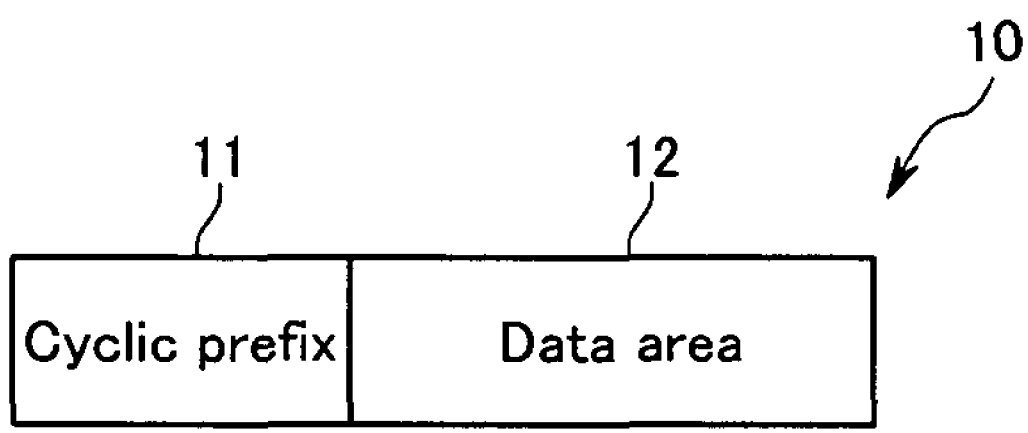
FIG. 1 shows a block diagram representing a data packet used in a conventional OFDM system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, unless explicitly described to the contrary, the word "comprise", and variations such as "comprises" or "comprising", will be understood to imply the inclusion of stated elements but not the exclusion of any other elements.

In addition, the word "module" will be understood to indicate a unit for processing a predetermined function or operation, which may be realized by hardware, software, or a combination thereof.

Signal transmitting and receiving apparatuses according to an exemplary embodiment of the present invention will be described with reference to the figures.

Figure 2:
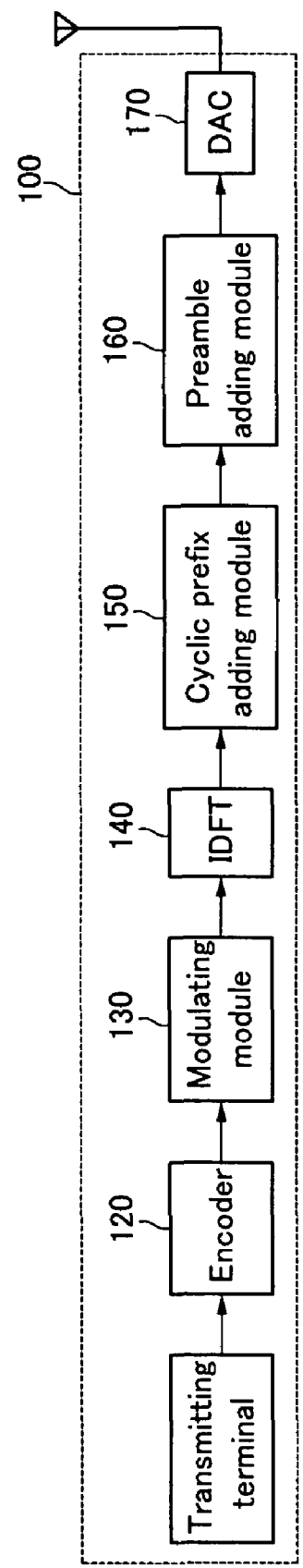
FIG. 2 shows a block diagram representing a signal transmitting apparatus of an orthogonal frequency-division multiplexing (OFDM) system according to an exemplary embodiment of the present invention.

FIG. 2 shows a block diagram representing a signal transmitting apparatus of an orthogonal frequency-division multiplexing (OFDM) system according to the exemplary embodiment of the present invention.

As shown in FIG. 2, the signal transmitting apparatus 100 according to the exemplary embodiment of the present invention includes an encoder 120, a modulating module 130, an inverse discrete Fourier transform module (IDFT) 140, a cyclic prefix adding module 150, a preamble adding module 160, and a digital-analog converting (DAC) module 170.

The encoder 120 encodes received binary sources and transmits the encoded sources to the modulating module 130.

The modulating module 130 modulates data, which are received from the encoder 120, according to a predetermined modulation method, and transmits the modulated data to the IDFT 140.

The IDFT 140 inverse discrete Fourier transforms the data received from the modulating module 130 and transmits the data to the cyclic prefix adding module 150.

The cyclic prefix adding module 150 transmits a symbol that is generated by adding a predetermined cyclic prefix to a symbol received from the IDFT 140, to the preamble adding module 160. In this case, the cyclic prefix is a period determined by considering a delay to a cell boundary area, which is a predetermined parameter value. In addition, the cyclic prefix includes predictable channel information so that the receiving apparatus may compensate a sampling clock signal error.

Further, the cyclic prefix is used as a variable period, and it may be expanded to a preamble area when a delay profile is less.

The preamble adding module 160 adds a predetermined preamble to the symbol received from the cyclic prefix adding module 150 and transmits the symbol to the DAC module 170.

In this case, a short preamble is used rather than using a long preamble in a like manner of a case in which a packet stating point is detected since the OFDM system for transmitting a high-capacity packet has detected the packet starting point by using the long preamble, and has approximately synchronized the packet by using the detected packet starting point.

The DAC module 170 converts the symbol, which is received from the preamble adding module 160, into an analog signal.

The signal transmitting apparatus 100 according to the exemplary embodiment of the present invention simultaneously obtains the cyclic prefix and a preamble period so that the receiving apparatus uses the cyclic prefix and the preamble period to perform symbol synchronization and phase compensation. In addition, according to the exemplary embodiment of the present invention, since the cyclic prefix and the preamble period are variably used, performance degradation, which is caused by a sampling period difference between the transmitting apparatus and the receiving apparatus of terminals using a high SNR and a high order modulation (i.e., a channel environment is excellent), may be prevented.

Figure 3:
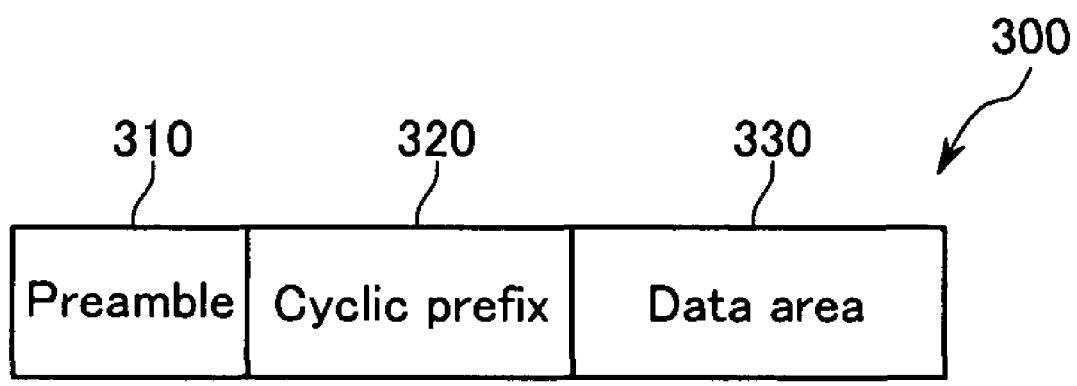
FIG. 3 shows a block diagram representing a symbol structure including the preamble and the cyclic prefix, which is generated by the transmitting apparatus according to the exemplary embodiment of the present invention.

FIG. 3 shows a block diagram representing a symbol structure including the preamble and the cyclic prefix, which is generated by the transmitting apparatus according to the exemplary embodiment of the present invention.

As shown in FIG. 3, the symbol 300 according to the exemplary embodiment of the present invention includes a preamble 310, a cyclic prefix 320, and a data area 330.

The preamble 310 and the cyclic prefix 320 are generated by the cyclic prefix adding module 150 and the preamble adding module 160 shown in FIG. 2, and they may be changed when the delay profile is less.

The receiving apparatus receiving the data packet performs symbol synchronization by using the preamble, performs phase synchronization, and compensates a sampling clock signal error caused by a slight period difference.

Figure 4:
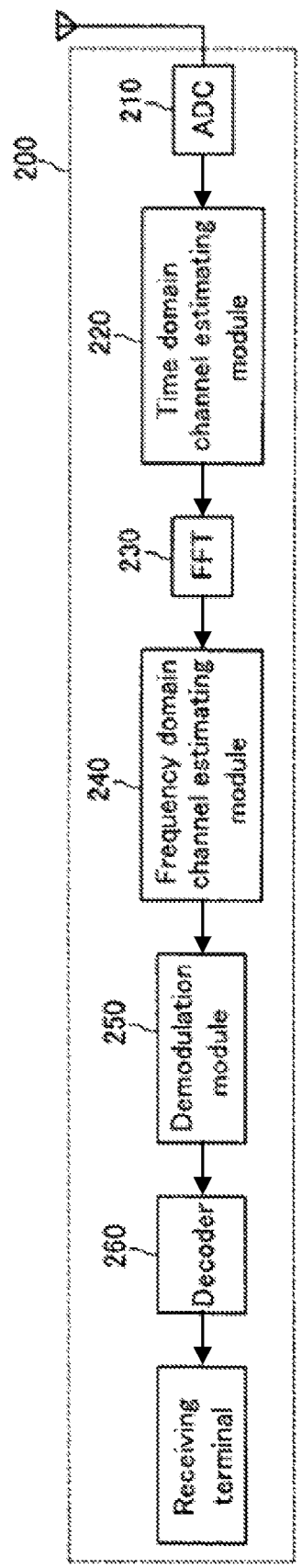
FIG. 4 shows a block diagram representing a receiving apparatus of the OFDM system according to the exemplary embodiment of the present invention.

FIG. 4 shows a block diagram representing the receiving apparatus of the OFDM system according to the exemplary embodiment of the present invention.

As shown in FIG. 4, the receiving apparatus 200 according to the exemplary embodiment of the present invention includes an analog-digital modulating module (ADC) 210, a time domain channel estimating module 220, a discrete Fourier transform module (FFT) 230, a frequency domain channel estimating module 240, a demodulation module 250, and a decoder 260.

The ADC 210 receives an OFDM symbol transmitted from the transmitting apparatus 100 shown in FIG. 2, converts the OFDM symbol into a digital symbol, and transmits the digital symbol to the time domain channel estimating module 220.

The time domain channel estimating module 220 extracts the preamble 310 and the cyclic prefix 320 from the symbol received from the ADC 210, calculates a synchronization value and a phase value for estimating a channel by using the extracted preamble and cyclic prefix 310 and 320, compensates the channel by using the extracted synchronization and phase values, and transmits the compensated symbol to the discrete Fourier transform module 230.

In this case, the time domain channel estimating module 220 uses a linear cross correlation equation given as Equation 5, obtains an index having a greatest cross correlation value, and obtains a symbol synchronization value to perform the symbol synchronization. In addition, the time domain channel estimating module 220 uses the obtained symbol synchronization value and synchronizes the symbol. Here, the linear cross correlation is given as Equation 5.

$$\text{find}\left\{\text{Max}_{j=0}^{j=PL} \sum_{i=0}^{i=L-1} x_i \times y_{i+j}\right\} \qquad \text{[Equation 5]}$$

Here, $x_i$ denotes preamble information, and $y_{i+j}$ denotes received symbol information.

The time domain channel estimating module 220 uses Equation 6 to obtain a q value for compensating a phase, and performs a first phase compensation for the received data by using the obtained q value.

$$\theta = \arctan\left[\frac{\sum_{i=0}^{L} \text{Im}(x_i^* \times y_i)}{\sum_{i=0}^{L} \text{Re}(x_i^* \times y_i)}\right] \qquad \text{[Equation 6]}$$

After performing the symbol synchronization and the phase compensation by using the preamble, the time domain channel estimating module 220 eliminates the preamble period and performs a second phase compensation by using the cyclic prefix.

The discrete Fourier transform module 230 performs discrete Fourier transform for the symbol received from the time domain channel estimating module 220, and transmits the symbol to the frequency domain channel estimating module 240.

The frequency domain channel estimating module 240 estimates a frequency domain channel based on data received from the discrete Fourier transform module 230, and performs compensation according to the estimated frequency domain channel.

The demodulation module 250 generates binary sources by demodulating the data received from the frequency domain channel estimating module 240, and transmits the generated binary sources to a subsequent terminal (not shown).

The receiving apparatus 200 according to the exemplary embodiment of the present invention performs synchronization and phase compensation for the data received from the transmitting apparatus 100, prevents the accumulated phase difference caused by the slight time error between the transmitting and receiving apparatuses, and improves the SNR.

Figure 5:
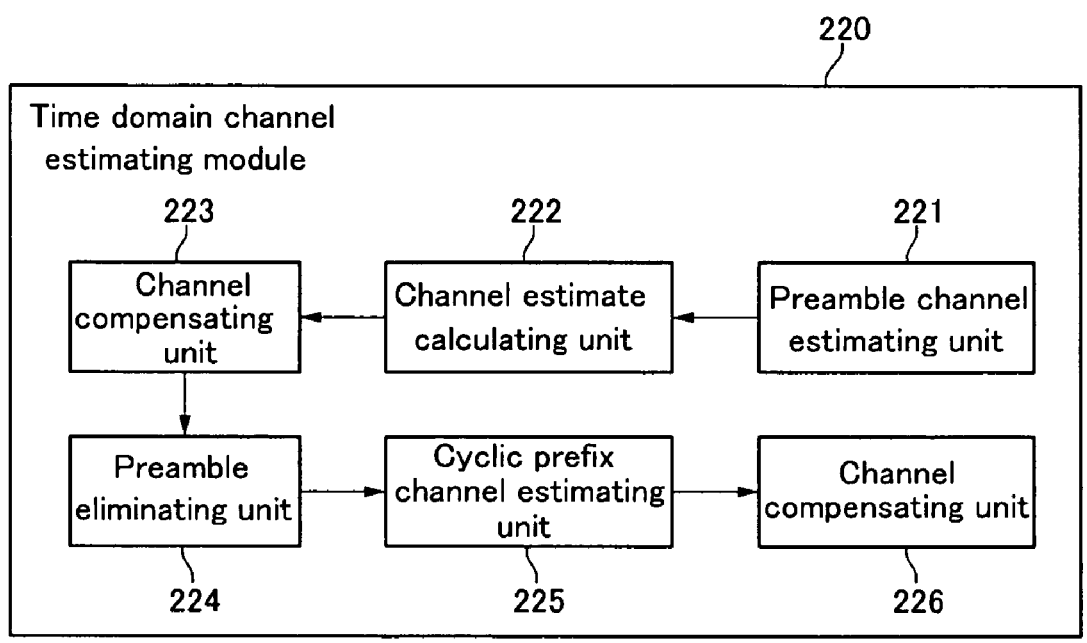
FIG. 5 shows a block diagram representing a time domain channel estimating module of the receiving apparatus according to the exemplary embodiment of the present invention.

FIG. 5 shows a block diagram representing the time domain channel estimating module of the receiving apparatus according to the exemplary embodiment of the present invention.

As shown in FIG. 5, the time domain channel estimating module 220 according to the exemplary embodiment of the present invention includes a preamble channel estimating unit 221, a channel estimate calculating unit 222, a channel compensating unit 223, a preamble eliminating unit 224, a cyclic prefix channel estimating unit 225, and a channel compensating unit 226.

The preamble channel estimating unit 221 detects a preamble from a symbol received from the ADC module 210 shown in FIG. 4, and estimates a channel by using the detected preamble.

The channel estimate calculating unit 222 calculates a channel estimate value based on the channel estimated by the preamble channel estimating unit 221. In this case, the calculated channel estimate value is the symbol synchronization value and the phase value calculated as Equation 5 and Equation 6.

The channel compensating unit 223 compensates the channel estimate value of the data received from the ADC module 210, and transmits the data to the preamble eliminating unit 224.

The preamble eliminating unit 224 eliminates the preamble from the symbol received from the channel compensating unit 223, and transmits the symbol to the cyclic prefix channel estimating unit 225.

The cyclic prefix channel estimating unit 225 estimates the channel by using the cyclic prefix in the symbol received from the preamble eliminating unit 224. In this case, the cyclic prefix channel estimating unit 225 calculates the phase value for compensating the channel by using the cyclic prefix.

The channel compensating unit 226 compensates the symbol channel by using the channel estimate value (i.e., the calculated phase value) of the cyclic prefix channel estimating unit 225, and transmits the symbol to the discrete Fourier transform module 230.

Figure 6:
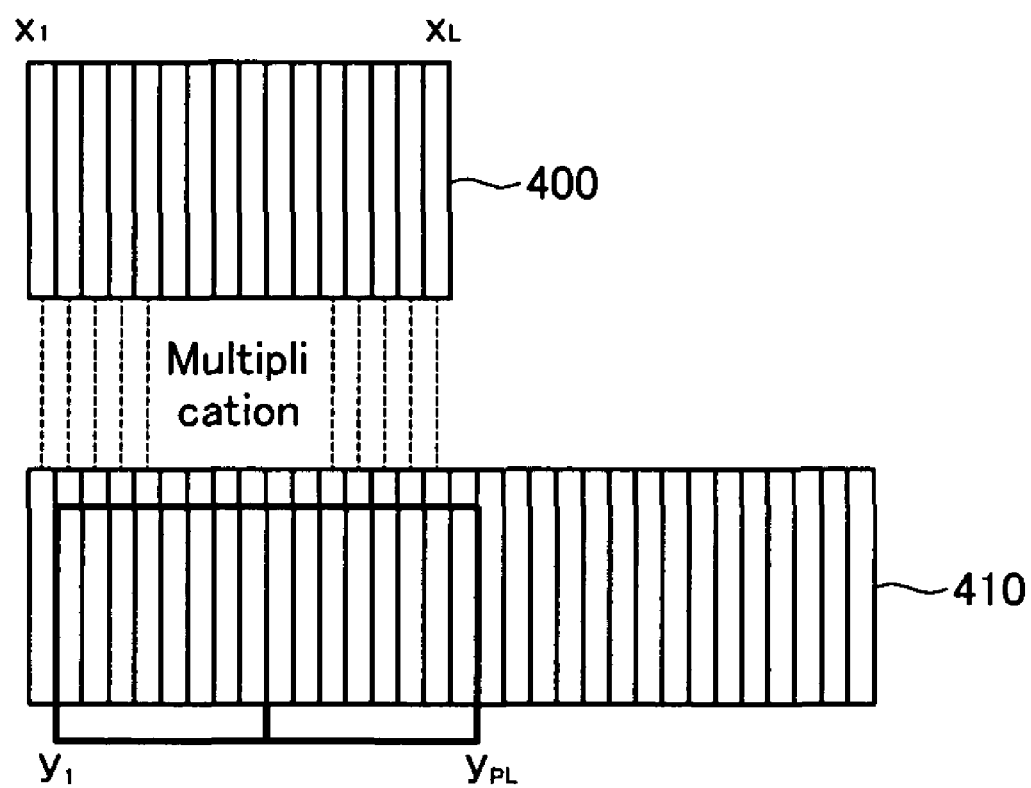
FIG. 6 shows a diagram representing a linear cross correlation of the time domain channel estimating module of the receiving apparatus according to the exemplary embodiment of the present invention.

FIG. 6 shows a diagram representing the linear cross correlation of the time domain channel estimating module of the receiving apparatus according to the exemplary embodiment of the present invention.

As shown in FIG. 6, in the linear cross correlation according to the exemplary embodiment of the present invention, a preamble 400 and received signal information 410 are multiplied by each other to perform the symbol synchronization.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, since the signal transmitting and receiving apparatuses minimize the sampling clock error caused by the slight period difference therebetween, the accumulated phase error caused by the slight time error may be prevented, and the SNR may be improved.

In addition, the receiving apparatus may minimize a delay caused between symbols when compensating a channel.

What is claimed is:
1. A signal transmitting apparatus comprising:
an inverse discrete Fourier transform module for receiving modulated data, performing inverse discrete Fourier transform, and generating a first symbol;
a cyclic prefix adding module for adding a predetermined cyclic prefix to the first symbol, and generating a second symbol;
a preamble adding module for adding a predetermined preamble to the second symbol, and generating a third symbol; and
a digital-analog converting hardware module for converting the third symbol including the cyclic prefix and the preamble into an analog symbol,
wherein the preamble is arranged to be used by a receiving apparatus to compensate, by a time domain analysis, synchronization and a phase of data received by the receiving apparatus, followed by usage of the cyclic prefix by the receiving apparatus to compensate, by another time domain analysis, a sampling clock signal error and the phase of the data.

2. The signal transmitting apparatus of claim 1, wherein a short preamble is used as the preamble, and it is added to a former part of the second symbol since there is delay in a wireless environment.

3. The signal transmitting apparatus of claim 1, wherein the cyclic prefix is determined by considering a delay to a cell boundary area.

4. The signal transmitting apparatus of claim 1, wherein the cyclic prefix and the preamble may have variable periods.

5. A signal transmitting apparatus comprising:
an inverse discrete Fourier transform module configured to receive modulated data and generate a first symbol by performing inverse discrete Fourier transform on the received data;
a cyclic prefix adding module configured to generate a second symbol by adding a predetermined cyclic prefix to the first symbol;
a preamble adding module configured to generate a third symbol by adding a predetermined preamble to the second symbol; and
a digital-analog converting hardware module configured to convert the third symbol into an analog symbol,
wherein the preamble is arranged to be used by a receiving apparatus to compensate, by a time domain analysis, synchronization and a phase of data received by the receiving apparatus, followed by usage of the cyclic prefix by the receiving apparatus to compensate, by another time domain analysis, a sampling clock signal error and the phase of the data.

6. A signal transmitting method comprising:
receiving modulated data; generating a first symbol by performing inverse discrete Fourier transform on the received data
generating, by a cyclic prefix adding module, a second symbol by adding a predetermined cyclic prefix to the first symbol;
generating a third symbol by adding a predetermined preamble to the second symbol; and
converting, by a digital-analog converting module, the third symbol into an analog symbol, wherein the preamble is arranged to be used by a receiving apparatus to compensate, by a time domain analysis, synchronization and a phase of data received by the receiving apparatus, followed by usage of the cyclic prefix by the receiving apparatus to compensate, by another time domain analysis, a sampling clock signal error and the phase of the data.

* * * * *